(12) United States Patent
Chang et al.

(10) Patent No.: US 11,263,172 B1
(45) Date of Patent: Mar. 1, 2022

(54) MODIFYING A PARTICULAR PHYSICAL SYSTEM ACCORDING TO FUTURE OPERATIONAL STATES

(71) Applicant: International Business Machines Corporation, Armonk, NY (US)

(72) Inventors: Yuan-Chi Chang, Armonk, NY (US); Venkata Nagaraju Pavuluri, New Rochelle, NY (US); Dharmashankar Subramanian, White Plains, NY (US); Long Vu, Chappaqua, NY (US); Debarun Bhattacharjya, New York, NY (US); Timothy Rea Dinger, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/141,116

(22) Filed: Jan. 4, 2021

(51) Int. Cl.
*G06F 16/11* (2019.01)
(52) U.S. Cl.
CPC .................. *G06F 16/128* (2019.01)
(58) Field of Classification Search
CPC ...... G06F 16/128; G06F 16/11; G06F 16/122; G06F 16/125
See application file for complete search history.

(56) References Cited

U.S. PATENT DOCUMENTS

| | | |
|---|---|---|
| 5,544,281 A | 8/1996 | Maruoka |
| 6,125,105 A * | 9/2000 | Edwards ............. H04L 12/5602 370/230 |
| 6,594,622 B2 * | 7/2003 | Srivastava .............. G06F 17/16 702/189 |
| 7,251,589 B1 * | 7/2007 | Crowe .................... G06F 17/18 702/181 |
| 7,987,106 B1 * | 7/2011 | Aykin .................. G06Q 10/063 705/7.11 |
| 8,027,862 B2 | 9/2011 | Sakurai |

(Continued)

FOREIGN PATENT DOCUMENTS

GB 2547712 * 2/2016 ............. G06F 17/18

OTHER PUBLICATIONS

11 Classical Time Series Forecasting Methods in MATLAB.
(Continued)

*Primary Examiner* — Robert W Beausoliel, Jr.
*Assistant Examiner* — Susan F Rayyan
(74) *Attorney, Agent, or Firm* — Law Office of Jim Boice

(57) ABSTRACT

A method, computer program product, and/or computer system improves a future efficiency of a specific system. One or more processors receive multiple historical data snapshots that describe past operational states of a specific system. The processor(s) identify a time series pattern for the time series of data in the multiple historical snapshots and calculate their variability. The processor(s) then determine that the variability in a first sub-set of the time series pattern is larger than a predefined value, and determine that future values of the first set of the time series pattern are a set of non-forecastable future values. The processor(s) also determine that the variability in a second sub-set of the time series pattern for the data is smaller than the predefined value, and utilizes this second sub-set to modify the specific system at a current time.

20 Claims, 14 Drawing Sheets

(56) References Cited

U.S. PATENT DOCUMENTS

| | | | |
|---|---|---|---|
| 8,108,243 B2* | 1/2012 | Solotorevsky | G06Q 10/0639 |
| | | | 705/7.29 |
| 2004/0133393 A1 | 7/2004 | Misium | |
| 2015/0205691 A1 | 7/2015 | Seto | |
| 2016/0239264 A1 | 8/2016 | Mathur | |
| 2017/0249534 A1* | 8/2017 | Townsend | G06N 3/0454 |
| 2019/0379589 A1* | 12/2019 | Ryan | G06N 3/082 |
| 2020/0034718 A1* | 1/2020 | Beedu | G06F 3/065 |
| 2020/0125280 A1* | 4/2020 | Chen | G06F 11/3414 |
| 2020/0301881 A1* | 9/2020 | Bhattacharya | G06F 16/9027 |
| 2021/0034994 A1* | 2/2021 | Stocker | G06F 16/285 |
| 2021/0117377 A1* | 4/2021 | Savir | G06F 16/128 |
| 2021/0149770 A1* | 5/2021 | Doddaiah | G06F 11/1471 |
| 2021/0319338 A1* | 10/2021 | Lui | G06N 20/00 |

OTHER PUBLICATIONS

Anderson-Darling test—Wikipedia.
Kolmogorov-Smirnov test—Wikipedia.
SAS Forecast Server Automates Business Forecasting | SAS.
Scipy.stats.epps_singleton_2samp—SciPy v1.5.4 Reference Guide.
Scipy.stats.mannwhitneyu—SciPy v1.5.4 Reference Guide.
SPSS Forecasting—Overview | IBM.
Welch's t-test—Wikipedia.
P. Mell et al., "The NIST Definition of Cloud Computing", National Institute of Standards and Technology, Information Technology Laboratory, Sep. 2011, pp. 1-7.

* cited by examiner

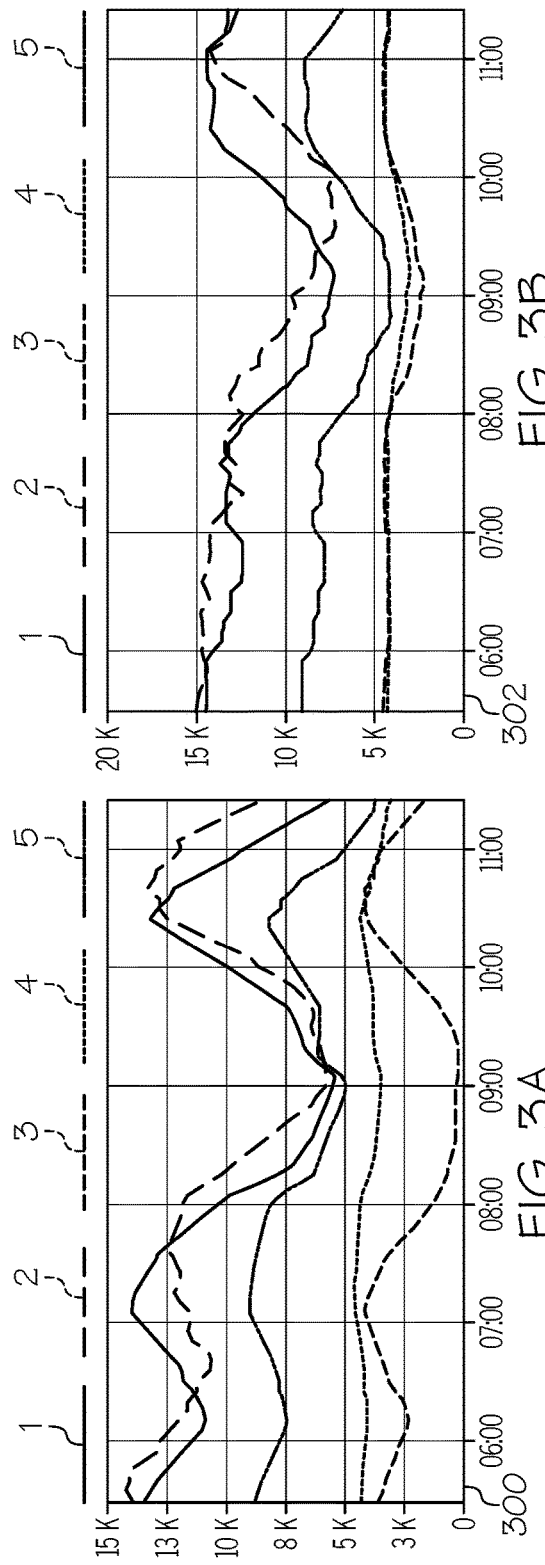
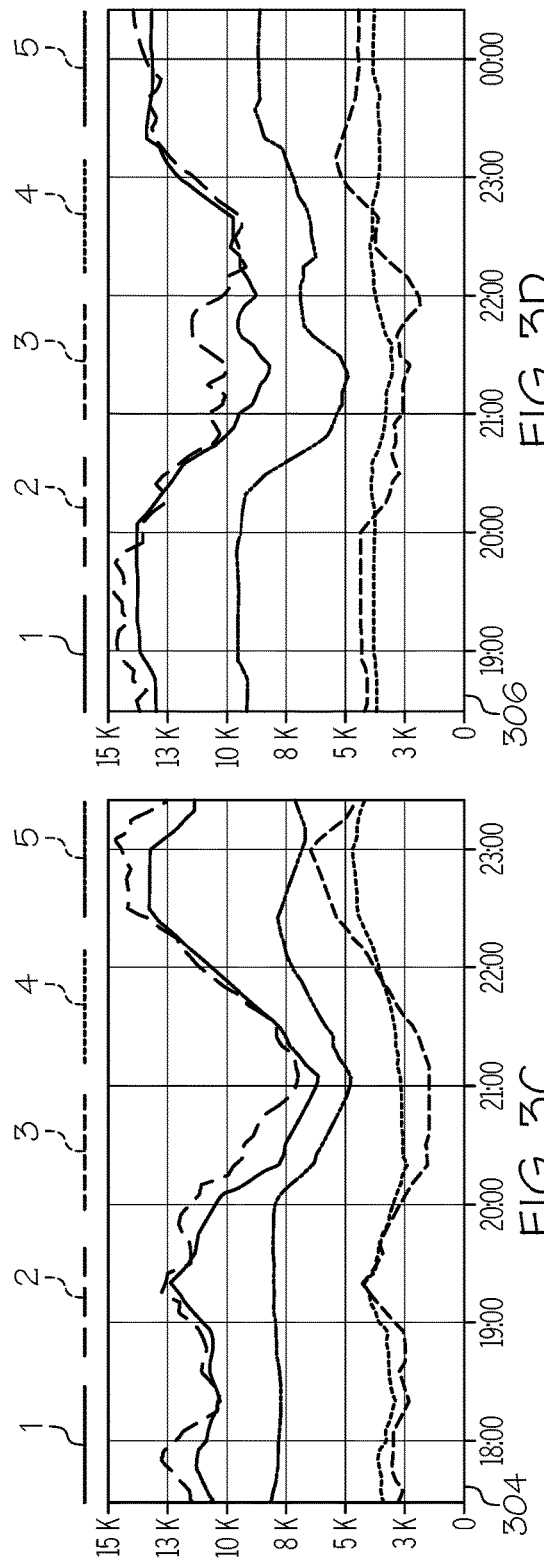
FIG. 3A
FIG. 3B
FIG. 3C
FIG. 3D

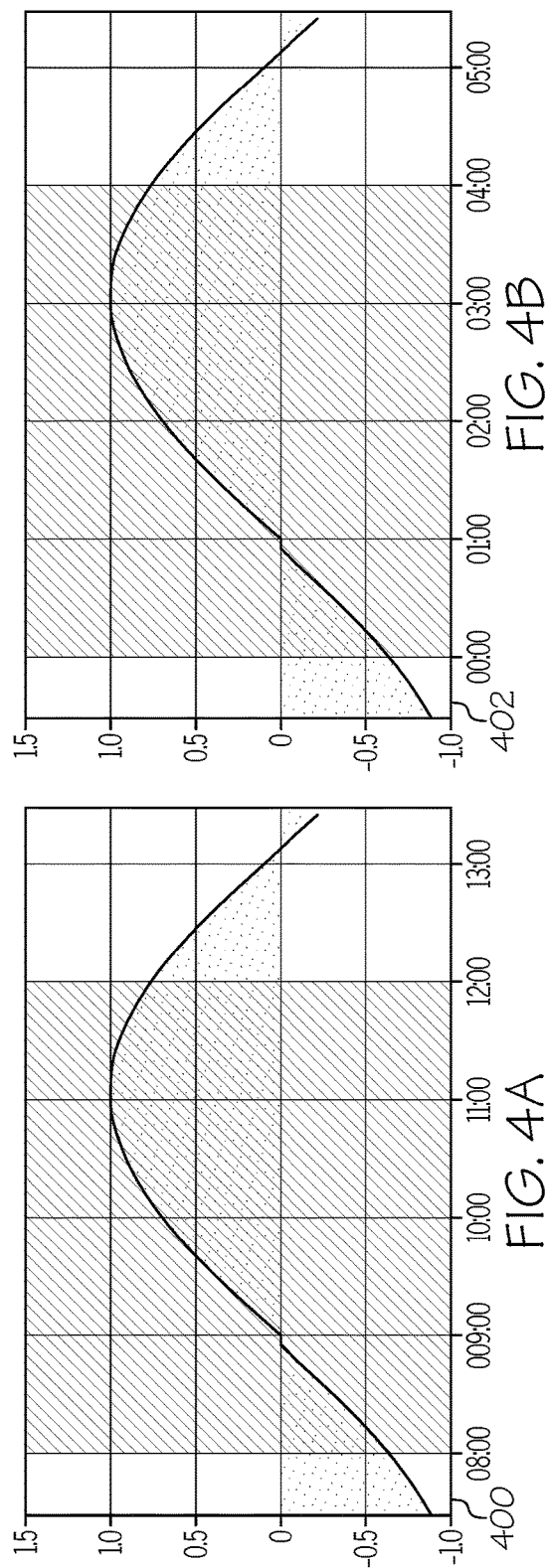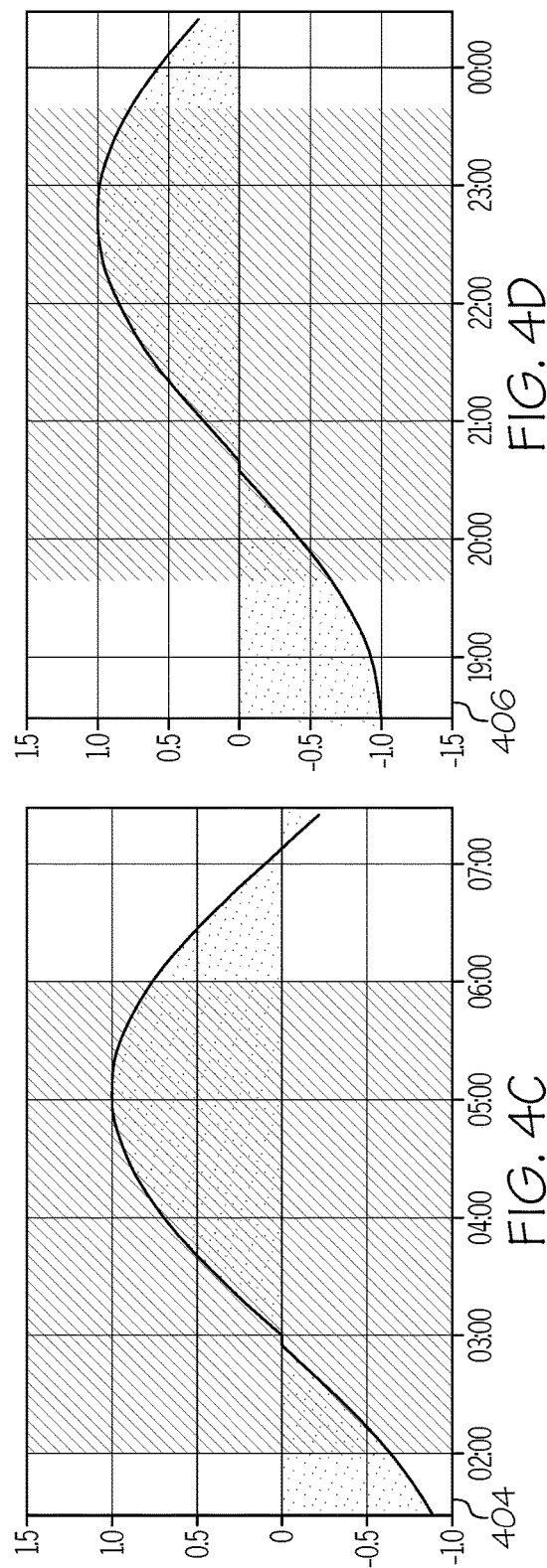

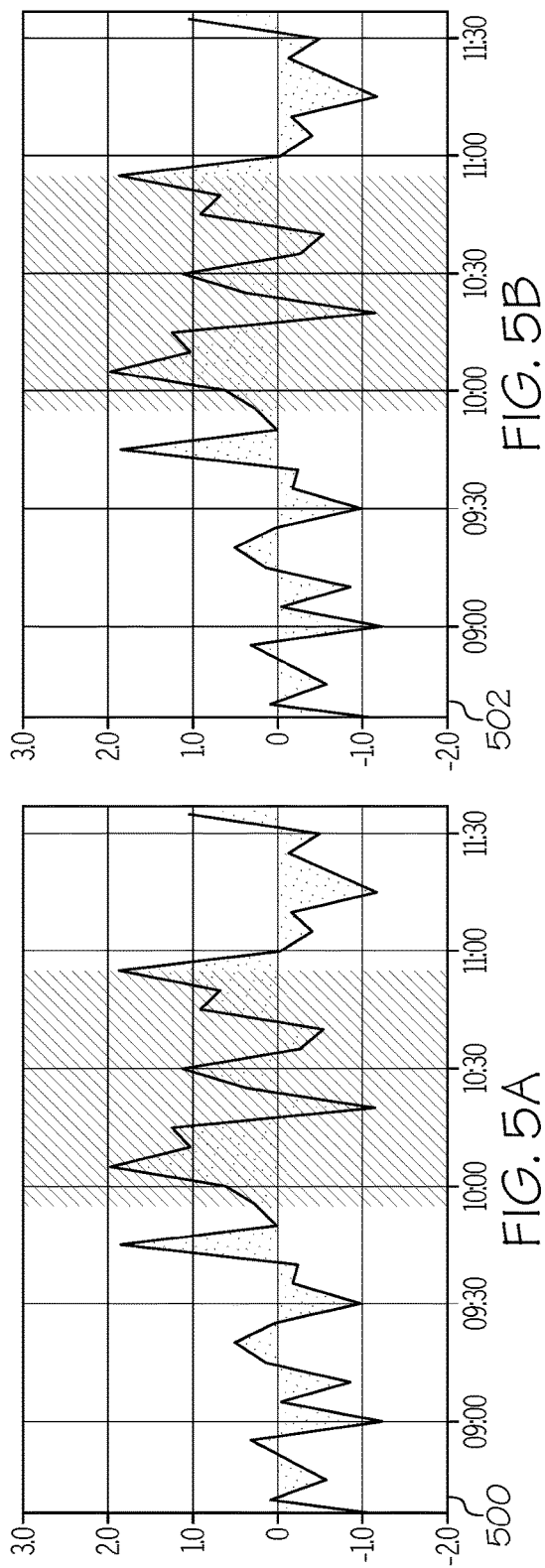
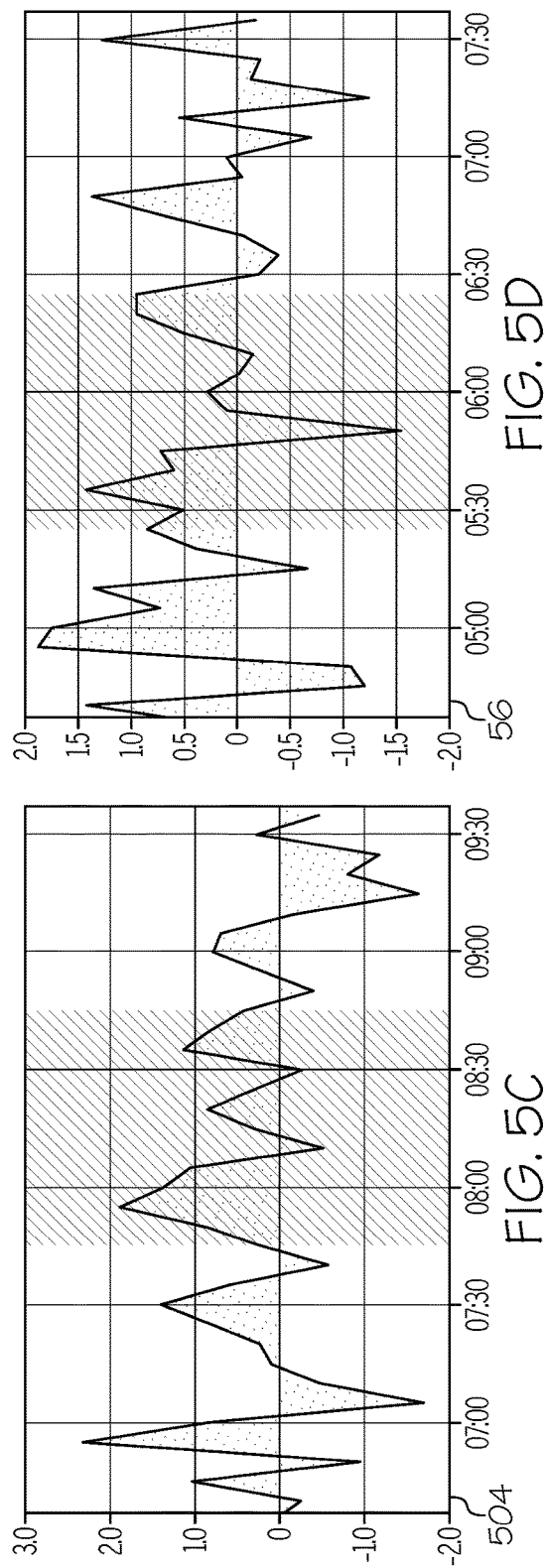

MODIFYING A PARTICULAR PHYSICAL SYSTEM ACCORDING TO FUTURE OPERATIONAL STATES

BACKGROUND

The present invention relates to the field of physical systems. Still more specifically, the present invention relates to the field of identifying and modifying physical systems in order to comport with future operational states of physical systems.

Time series forecasting has been broadly applied in manufacturing, retail and financial industries. Recent advances in sensor instrumentation in manufacturing facilities and machinery, as well as wireless connectivity such as 5G, increase the number of generated time series tremendously. Forecasting these time series data accurately into the future often brings operational and business benefits such as reducing unplanned outage, lengthening service length, and increasing production output. However, in practice it is common for human forecast modelers to encounter thousands to hundreds of thousands of sensor-emitted time series data. It is thus desirable to narrow down to a shorter list of time series that are more likely forecastable to achieve satisfactory accuracy.

Time series forecasting methods are used in statistical analysis and more recently, in machine learning with deep learning techniques. The frequent starting point of applying these software tools is to import or load time series data of interest. However, practitioners often face the choice on what series should be imported, out of potentially thousands of choices.

Expectation of artificial intelligence and big data is to provide as much data as possible and to rely on sophisticated machine learning techniques to uncover underlying correlations and precursor signals that lead to more accurate forecast. Even with highly automated software tools, creating thousands of forecast models and having human practitioners review the results are computationally expensive and time consuming. No forecast modeling tools aid in eliminating time series candidates that are hard to forecast and thus skip those impossible scenarios. One or more embodiments of the present invention address this gap.

SUMMARY

In one or more embodiments of the present invention, a method improves a future efficiency of a specific system by modifying, at a current time, the specific system in order to improve an efficiency of the specific system at a future time. One or more processors receive multiple historical data snapshots, where data in the multiple historical data snapshots describe past operational states of a specific system, and where the data in the multiple historical data snapshots is a time series of data. The processor(s) identify a time series pattern for the time series of data in the multiple historical snapshots and calculate measures of variability in values for the time series pattern for the time series of data in the multiple historical snapshots. The processor(s) then determine that the variability in the values for a first sub-set of the time series pattern is larger than a predefined value and, in response to determining that the variability in the values for a first sub-set of the time series pattern is larger than the predefined value, determine that future values of the first set of the time series pattern are a set of non-forecastable future values. The processor(s) also determine that the variability in the values for a second sub-set of the time series pattern for the data from the multiple historical snapshots is smaller than the predefined value. In response to determining that the variability in values for a second sub-set of the time series pattern is smaller than the predefined value, the processor(s) determine that future values of the second set of the time series pattern are a set of forecastable future values, and utilize the set of forecastable future values to modify, at a current time, the specific system to comport with the set of forecastable future values, such that modifying the specific system improves an efficiency of the specific system by causing the specific system to generate the second sub-set of the time series pattern at a future time. Thus, one or more embodiments of the present invention provide the advantage over the prior art of effectively and efficiently identifying data that is useful in modifying the specific system, in order to conserve evaluation resources while improving the efficiency of that specific system.

In one or more embodiments of the present invention, the particular system is a computer that utilizes one or more processors, and the method further includes replacing an existing component of the computer with a different component, where replacing the existing component with the different component causes the computer to not generate the second set-set of the time series pattern at the future time. These one or more embodiments provide the additional advantage of being able to efficiently and precisely improve the functionality of the computer system by identifying forecastable, but deleterious, features of the computer system.

In one or more embodiments of the present invention, the particular system is a unit of industrial equipment that is monitored and controlled by a computer system, and the method further includes replacing an existing component of the unit of industrial equipment with a different component, where replacing the existing component with the different component causes the unit of industrial equipment to not generate the second sub-set of the time series pattern at the future time. These one or more embodiments provide the additional advantage of being able to efficiently and precisely improve the functionality of the industrial equipment by identifying forecastable, but deleterious, features of the industrial equipment.

In one or more embodiments of the present invention, a computer program product and/or a computer system improve a future efficiency of a specific system by modifying, at a current time, the specific system in order to improve an efficiency of the specific system at a future time. One or more processors receive multiple historical data snapshots, where data in the multiple historical data snapshots describe past operational states of a specific system, and where the data in the multiple historical data snapshots is a time series of multivariate data. The processor(s) identify a time series pattern for the time series of multivariate data in the multiple historical snapshots and calculate measures of variability in K-step-ahead values for the time series pattern for the time series of multivariate data in the multiple historical snapshots. The processor(s) then determine that the variability in the K-step-ahead values for a first sub-set of the time series pattern is larger than a predefined value and, in response to determining that the variability in the K-step-ahead values for a first sub-set of the time series pattern is larger than the predefined value, determine that future values of the first set of the time series pattern are a set of non-forecastable future values. The processor(s) also determine that the variability in the K-step-ahead values for a second sub-set of the time series pattern for the multivariate data from the multiple historical snapshots is smaller than the predefined value. In response to determining that the variability in the K-step ahead values for a second sub-set of the time series pattern is smaller than the predefined value, the processor(s) determine that future values of the second set of the time series pattern are a set of forecastable future values, and utilize the set of forecastable future values to modify, at a current time, the specific system to comport with the set of forecastable future values, such that modifying the specific system improves an efficiency of the specific system by causing the specific system to generate the second sub-set of the time series pattern at a future time. Thus, one or more embodiments of the present invention provide the advantage over the prior art of effectively and efficiently identifying data that is useful in modifying the specific system, in order to conserve evaluation resources while improving the efficiency of that specific system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A-3D illustrate an exemplary user interface for a user to inspect similar historical snapshots retrieved after a query window was given, in accordance with one or more embodiments of the present invention;

FIGS. 4A-4D depict exemplary retrieved snapshots from a synthetic data history generated by the sine function in accordance with one or more embodiments of the present invention;

FIGS. 5A-5D illustrate retrieved snapshots from a synthetic data history generated by the Gaussian noise function in accordance with one or more embodiments of the present invention;

DETAILED DESCRIPTION

Figure 1:
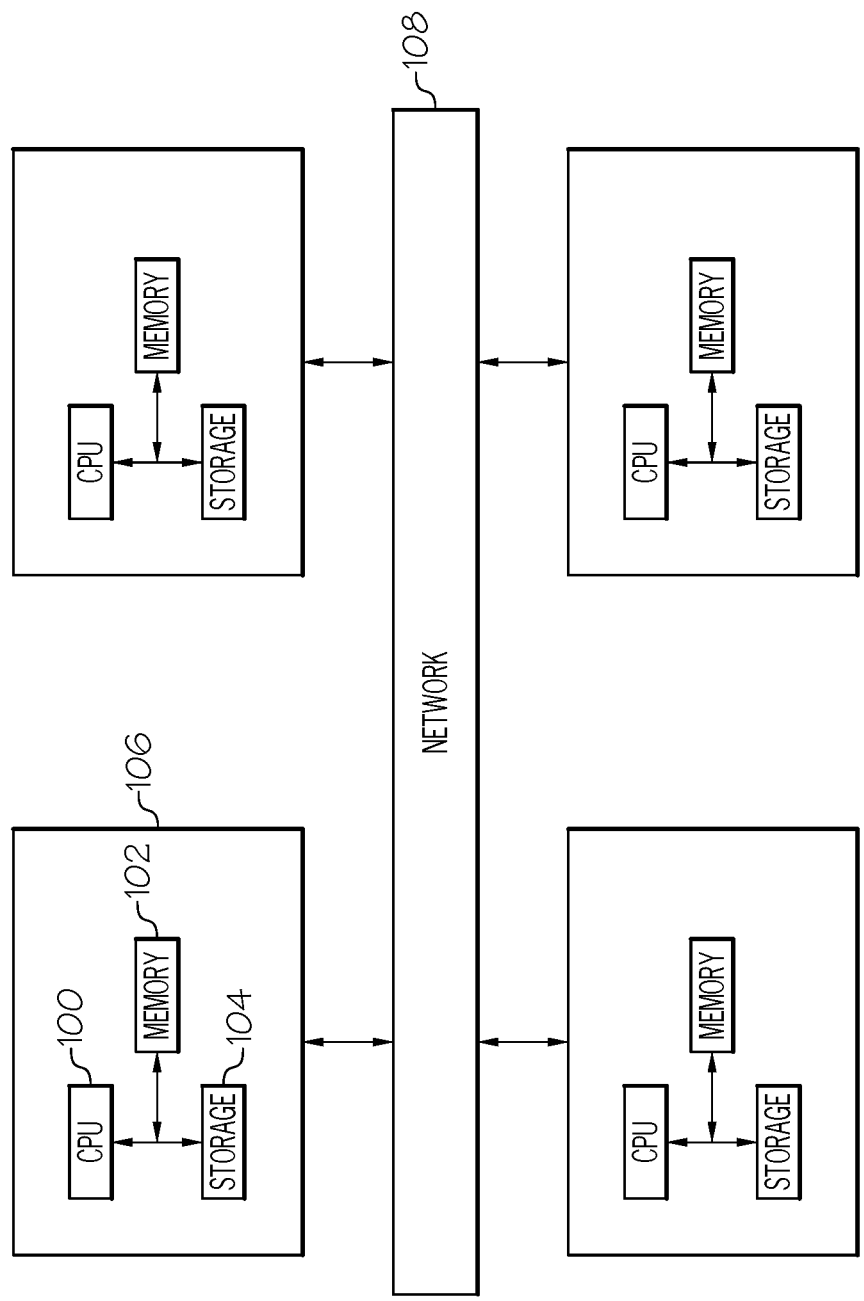
FIG. 1 illustrates a single computer server or a cluster of computer servers as used in accordance with one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

As described herein, one or more embodiments of the present invention relate generally to a forecastability assessment of numerical time series data to a fixed interval in the future. More specifically, the technique(s) presented herein identify a recurring time series of fixed window-sized snapshots in historical data, and collects their respective future values at a predetermined interval from the end of the aforementioned snapshots.

One or more embodiments of the present invention then compares the statistical distribution of these future values to that of a baseline. If the p-value (i.e., probability that a data difference occurred by random chance) of the statistical testing rejects the hypotheses that the two distributions were drawn from the same population, then the time series is likely forecastable, since it is deemed to be true when applied to different devices. If the hypotheses that identical distributions came from a same population/source/context were accepted, then the time series is likely not forecastable, since the data simply represents a constant pattern of a same device. When applying time series forecast modeling to a very large number of machine or sensor emitted data in manufacturing facilities, one or more embodiments of the invention teaches a method to quickly narrow down the potentially large number of time series to a shorter list that is likely to succeed in forecast modeling, which is less time consuming and computationally less expensive to create, thereby improving the functionality of the computer system that is performing the operations described herein.

As such, one or more embodiments of the present invention distinguishes over prior art in the aspects of efficiency and explainability.

First, one or more embodiments of the present invention are more computationally efficient than automated or manual forecast model building. The time saved is significant in problem domains with hundreds to thousands of time series to explore.

Second, one or more embodiments of the present invention outputs explanations to unforecastable time series with identified historical sample periods. These samples substantiate the unforecastable claim by showing the wide divergence of future values or undifferentiable distributions to historical baseline, thereby demonstrating that forecast accuracy will always be poor.

As described herein then, one or more embodiments of the present invention provide a computer implemented method, data processing system, and computer program product for assessing forecastability of time series data with recurring snapshots. In one or more embodiments of the present invention, forecastability is determined by testing the hypotheses that future values of those recurring snapshots are drawn from the same data value distribution without conditioning on the snapshots. If the hypotheses were rejected, i.e. the distributions are deemed different, detailed forecast modeling is expected to produce an accurate forecast by learning from the snapshots. Otherwise, the two distributions, one conditioned on the snapshots and one without, could not be distinguished apart and thus similar snapshot histories are not used to make an accurate forecast.

Multiple statistical measures of hypothesis testing, including but not limited to Welch's t-test, Epps-Singleton, Mann-Whitney, Kolmogorov-Smirnov, and Anderson-Darling tests, are used in one or more embodiments of the present invention to reject or accept the hypothesis.

With reference now to the figures and in particular with reference to FIG. 1, a high-level pictorial representation of a single computer server or a cluster of computer servers in which one or more embodiments of the present invention is implemented is shown. The system depicted in FIG. 1 includes one or more servers, including labeled server 106, which are interconnected via a network 108. Each server, such as server 106, has one or more central processing unit (CPU) 100, main memory 102 (e.g., volatile memory) and storage devices 104 (e.g., non-volatile memory). Code or instructions implementing the processes of the illustrative embodiments are executed by the CPU 100 and located temporarily in the main memory 102. The storage devices 104 are used to store the instructions as well as time series data to be processed by the system. The time series data, when it requires more storage space than available on a single server, is partitioned by non-overlapping time periods and stored across distributed servers in the system.

Figure 2:
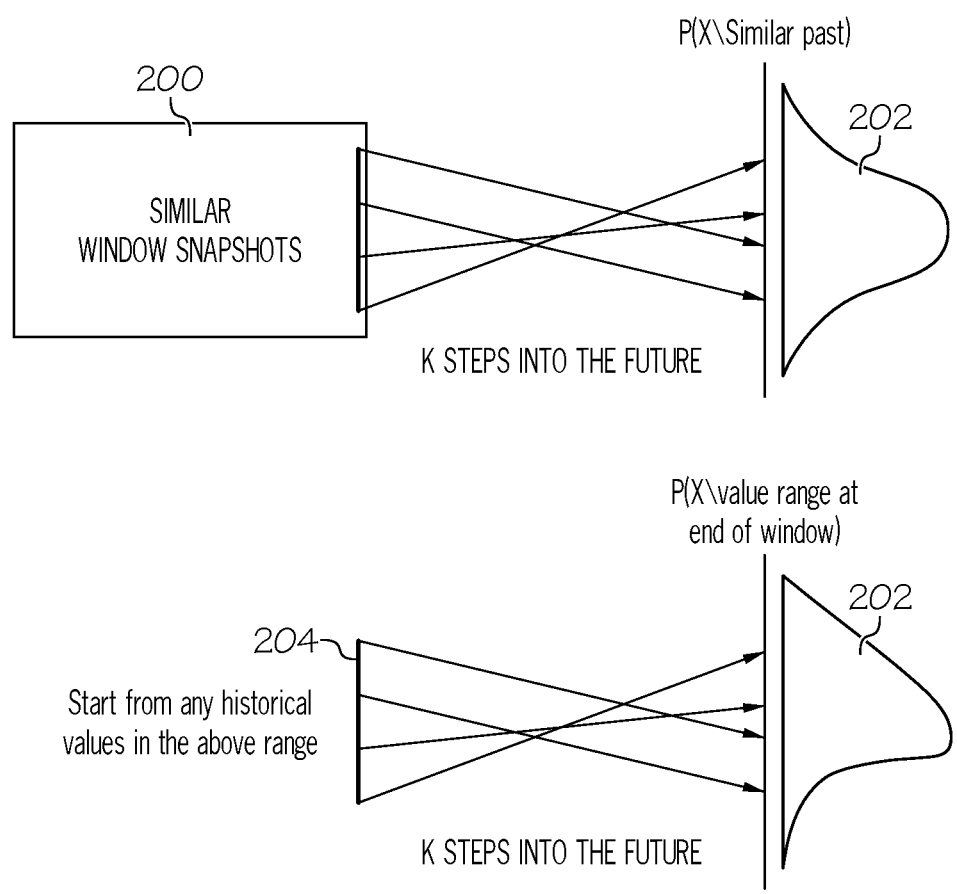
FIG. 2 depicts a core conceptual framework for comparing future data value distributions with and without the knowledge of recurring, similar snapshots in the historical data in accordance with one or more embodiments of the present invention.

FIG. 2 presents an explanatory pictorial representation of a core conceptual framework which seeks to compare future data value distributions with and/or without the knowledge of recurring, similar snapshots in the historical data.

Similar window snapshots 200 are first identified by a manual and/or automatic search. Data value distribution of the K-step future is depicted as a probability density function (PDF) 202.

In contrast, a second PDF 206 of another K-step future is derived solely from the range of data values at the end of snapshot windows 204, without the similarity constraint. The PDF 206 reflects the conditional probability that only relies on the last values but not the history prior.

One or more embodiments of the present invention test a hypothesis that PDF 202 and PDF 206 were sampled from the same population. If the hypothesis is accepted, this implies that windowed historical data cannot help differentiating forecasted data values. However, if the hypothesis is rejected, this implies that windowed historical data has the potential to differentiate forecasted data values.

Turning now to FIGS. 3a-3D, exemplary displays on a human computer interface (e.g., a graphical user interface—GUI) present similar historical snapshots retrieved after a query window was given at historical window snapshot 300. The visual interface renders historical window snapshot 302, historical window snapshot 304, historical window snapshot 306 identified by search using L1 metrics (i.e., the sum of the magnitudes of the vectors), L2 metrics (i.e., the square root of the sum of the squared vector values), or other distance metrics. Each of the depicted historical window snapshots 302, 304, 306, and 308 present data lines, identified as data line 1, data line 2, data line 3, data line 4, and data line 5, which represent data at different times of a day shown in the X-axis, and represent values shown in the Y-axis. In one or more embodiments of the present invention, the different values shown on the X-axis are days of the week, days of the year, weeks in a year, years, etc. In various embodiments of the present invention, time periods are the same for all historical window snapshots.

In FIGS. 3A-3D, different lines on a same graph represent different time series variables, in the generalized setting of a multivariate time series forecasting problem. In one or more embodiments of the present invention, these similar snapshot windows are thresholded by a suitable preset distance upper bound by data scientists. Alternatively, the rendered windows are visually inspected by subject matter experts to accept or reject some or all of the retrieved snapshots.

FIGS. 4A-4D depict snapshots of a synthetic data history generated by the sine function with y-axis bounded between −1 and 1. The query window 400 is a short segment of the sine wave and similar snapshots, due to the recurring nature of the sine wave, can be seen at window 402, window 404 and window 406. A recurring sine wave window, as understood mathematically, always has one single fixed value at the K-step future. In contrast, if only the last values of window 402, window 404 and window 406 were used to find their respective K-step futures, there would be two fixed values, as opposed to one fixed value. The two PDFs of K-step outcomes thus are distinct. A such, this simple case of a sine wave is forecastable. As shown in the X-axis for these windows, the data is for certain times of a day, and the Y-axis presents a scale for the depicted data. In one or more embodiments of the present invention, the different values shown on the X-axis are days of the week, days of the year, weeks in a year, years, etc. In various embodiments of the present invention, time periods are the same for all historical window snapshots.

Following the forecastable sine wave example, FIGS. 5A-5D depict the other extreme of possibly recurrent data, such as the depicted unpredictable Gaussian noise sequence. In a long noise sequence, very short snapshots can still be found that are similar to each other by random chance, as depicted in window 500, window 502, window 504, and window 506. These snapshots' similarity is purely by chance since there is no underlying structural pattern. Their K-step futures thus cannot be differentiated from the distributional data values of non-similar snapshots. As such, one or more embodiments of the present invention concludes that Gaussian noise is not forecastable. As shown in the X-axis for these windows, the data is for certain times of a day, and the Y-axis presents a scale for the depicted data. In one or more embodiments of the present invention, the different values shown on the X-axis are days of the week, days of the year, weeks in a year, years, etc. In various embodiments of the present invention, time periods are the same for all historical window snapshots.

Figure 6:
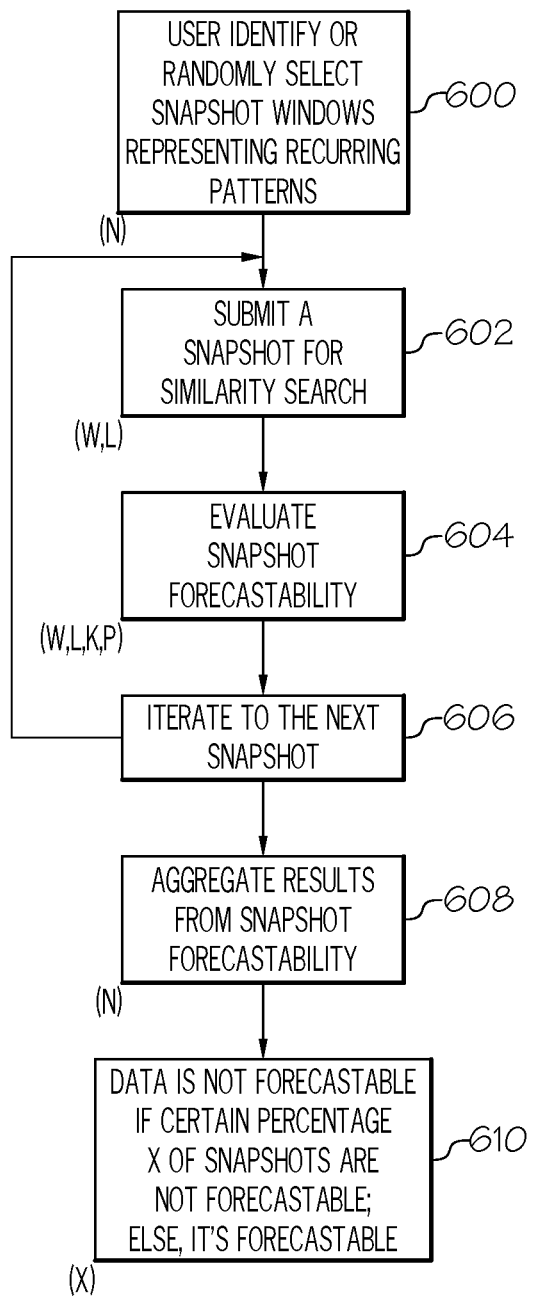
FIG. 6 is a high-level flow diagram to assess forecastability and introduces input parameters to an assessment method in accordance with one or more embodiments of the present invention.

Turning to FIG. 6, a high-level flow diagram of a process for assessing forecastability and introducing the input parameters to the assessment method of one or more embodiments of the present invention is presented.

First, a subject matter expert (user) identifies some snapshot windows of interest from the historical data, as shown in block 600. These snapshots can reflect domain specific events such as 24 hours before a pump failed or 30 mins before a boiler's temperature dropped below safe operating minimum. Alternatively, snapshot windows can be randomly selected, free of context, since raw data volume can be overwhelmingly large to select manually. The number of snapshot windows is denoted by the letter N.

Next a domain specific lookback window size W is chosen, as shown in block 602. W signifies how far back data in the past has influence on the future data values. In other words, an assumption is made that a data value at time T depends only on values between time T−W and T. In addition, the similarity metric L for snapshot window comparison is given and its upper bound is limited (if two snapshot windows of length W are considered similar enough). Exemplary metrics used in one or more embodiments of the present invention include L1-norm (derived from a sum of the magnitudes of the data vectors) and L2-norm (derived from the square root of the sum of the squares of the values in each dimension of the data vectors).

Figure 7:
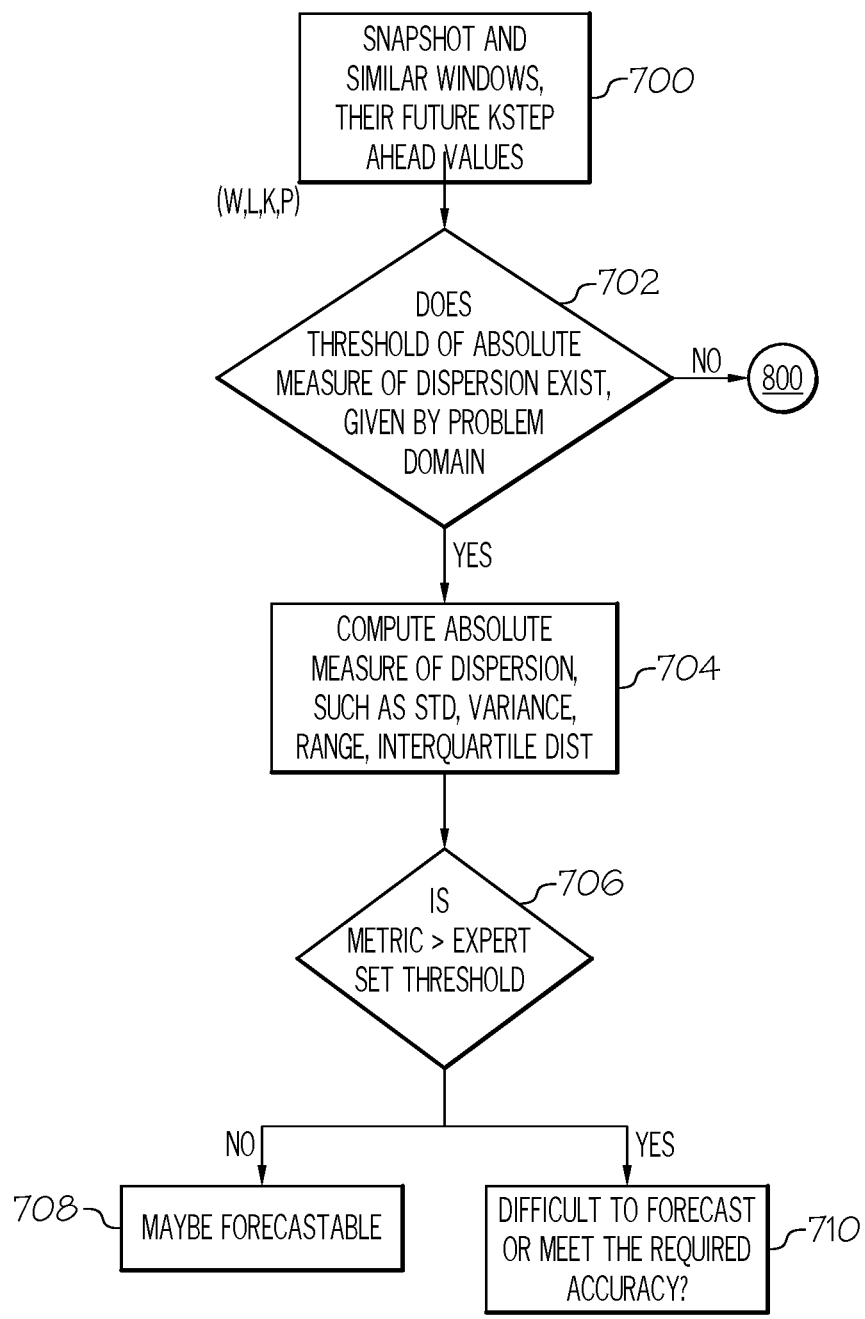
FIG. 7 is a flow diagram of steps taken to assess forecastability when the minimum forecast accuracy threshold is given by one or more domain experts, in accordance with one or more embodiments of the present invention.
Figure 8:
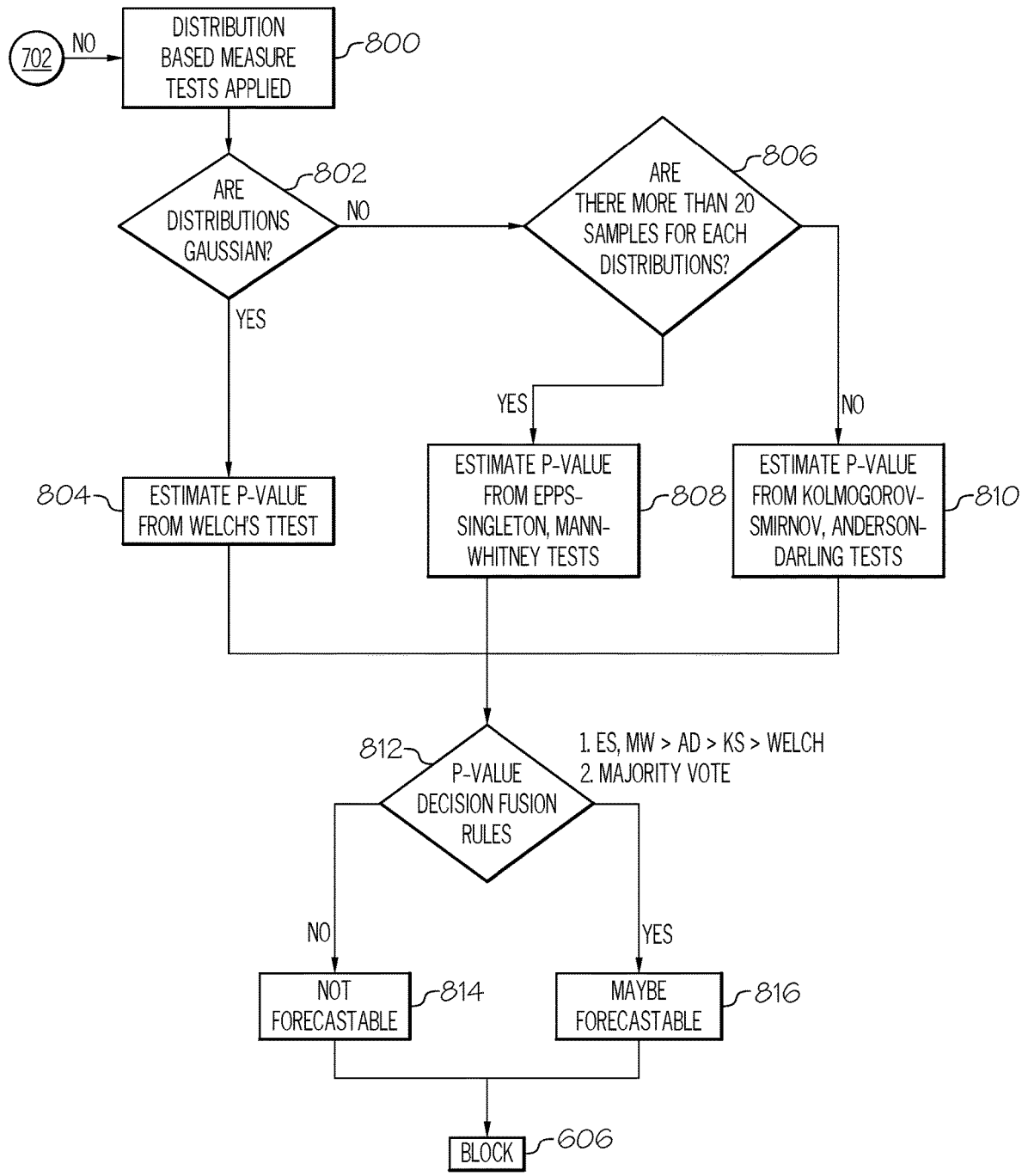
FIG. 8 is a flow diagram of steps taken to assess forecastability when minimum accuracy is not known and distribution hypothesis testing is applied, in accordance with one or more embodiments of the present invention.

Block 604 is a placeholder for the steps described in FIG. 7 and FIG. 8 to evaluate the forecastability of a single snapshot window. Two more input parameters are introduced by block 604. K is the number of time units in the future forecast. As such, forecast accuracy is measured by the difference to historical data value at T+K when a forecast is made based on values from T−W to T.

Another parameter for the hypothesis testing introduced with block 604 is the threshold for p-value P. To accept the hypothesis, in one or more embodiments of the present invention P is set at 0.05 or lower. Thus, a lower value means more that there is a strong likelihood that the data is forecastable.

The step depicted in block 606 iterates on the snapshots identified in 600 before it moves to the process described in block 608, which aggregates the snapshot forecastability results.

The forecastability assessment calls a time series dataset not forecastable if a certain percentage X of snapshots are not forecastable. Conversely, the time series is deemed forecastable in block 610.

In complex, multi-state time series data, some data segments can be forecastable while others might not be. X is thus an input parameter subject to the problem domain.

Turning to FIG. 7, a flow diagram to assess forecastability when the minimum forecast accuracy threshold is given by the domain experts is depicted. Starting with the given snapshot and identified similarity windows conditioned on (W, L), the K-step ahead values are collected in block 700. If thresholds of measures of dispersions were given by the problem domain (see query block 702), such as maximum range, maximum standard deviation or maximum interquartile range, then the dispersion measures are calculated using the K-step values, as shown in block 704. Otherwise, parametric and non-parametric tests are used starting at block 800 in FIG. 8.

The steps depicted in block 706, block 708, and block 710 compare calculated dispersion measures to the expert set thresholds. If below thresholds, the snapshot might be forecastable (block 708). If above thresholds, the snapshot forecast will likely exceed the accuracy tolerance to make the forecast useable (block 710).

In many practical applications, the noisy nature of the data frequently makes a long-range forecast beyond acceptable accuracy, while a short-term forecast is still acceptable. It is not uncommon that a snapshot might be deemed not forecastable for large K but forecastable for small K.

FIG. 8 depicts a flow diagram to assess forecastability when expert set accuracy threshold is not available and distribution hypothesis tests are applied, as shown in block 800. Two distributions are compared. The first distribution is derived from data values at time T+K of similar windows. The second distribution is derived from data values of all K-step ahead of end-of-window values, regardless of similarity as depicted in FIG. 2.

If the distributions are Gaussian (see query block 802), then a test, such as Welch's t-test that tests whether two data sets have equal mean values, is used to estimate the p-value, as shown in block 804.

However, if the distributions are not Gaussian (query block 802), other non-parametric (based on either being distribution-free or having a specified distribution but with the distribution's parameters unspecified) statistical tests are used in one or more embodiments of the present invention. If there are more than some predefined number (e.g., 20) samples for each distribution (query block 806), then the p-value is estimated by Epps-Singleton (based on empirical characteristic functions) and Mann-Whitney (a nonparametric test for determining whether two groups are independent of each other—see block 808).

However, if there are less than the predefined number (e.g., 20) of samples, then a Kolmogorov-Smirnov test (for quantifying distribution functions between two samples) and an Anderson-Darling test (for detecting a departure from a normal distribution) are used to estimate p-value, as shown in block 810.

The p-values derived in the steps shown in block 804, block 808, and/or block 810 are compared to P, and a decision fusion rule is applied, as shown in block 812. In one or more embodiments of the present invention, this fusion step implemented as a simple majority vote which declares forecastability if a majority of the hypothesis tests resulted in p-value below P. Alternatively, the decision fusion is built on a hierarchy in which Epps-Singleton (ES) and Mann-Whitney (MW) tests outweigh Anderson-Darling (AD) tests and Kolmogorov-Smirnov (KS) tests and Welch's t-tests, due to estimation robustness.

These non-parametric tests complement threshold-based dispersion measures to declare a snapshot's forecastability. After steps shown in 814 (in which predicted data is deemed to not be forecastable, and therefore can be discarded or otherwise ignored if the p-value is above P) and block 816 (in which predicted data may be forecastable, and therefore should be retained for use if the p-value is below P) the method returns to 606 in FIG. 6 to assess the next snapshot.

In one or more embodiments of the present invention, artificial intelligence is used to determine variabilities in the K-step (K-step-ahead) values for time series patterns of multivariate data in multiple historical snapshots. The multivariate data obtains its multivariate feature be being from different time periods, and/or from being generated by different sensor sources (e.g., different sensors of a same type that are part of computer sensors 1256 and/or industrial equipment sensors 1254 shown in FIG. 12), and/or from being generated by different sensor sources (e.g., different sensors of different types that are part of computer sensors 1256 and/or industrial equipment sensors 1254 shown in FIG. 12).

For example, and in one or more embodiments of the present invention, the multivariate data is simply a same type of data that comes from one or more sensors of a same type, such as throughput sensors or network interface sensors on a computer that measure bandwidth and/or bandwidth usage and/or throughput of a computer, and/or physical sensors on a unit of industrial equipment (e.g., a pump) that measures rotational pump speed, internal pressure, etc. on that unit of industrial equipment. In one or more embodiments, the sensors/sensor readings represent different types of states (e.g., computational throughput, memory usage, and network usage all used together as multivariate data).

In one or more embodiments of the present invention, artificial intelligence performs one or more of the features/processes/steps on multivariate data described in the present invention. In one or more embodiments of the present invention, this artificial intelligence (e.g., depicted as artificial intelligence 1224 in FIG. 12) utilizes an electronic neural network architecture, such as that found in a Deep Neural Network (DNN), a Convolutional Neural Network (CNN), or a Recurrent Neural Network (RNN). Since such multivariate data is a vector, an RNN is used in one or more preferred embodiments of the present invention.

Logic units within an electronic neural network (e.g., an RNN) are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are often only "excitatory" to varying degrees.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

Figure 9:
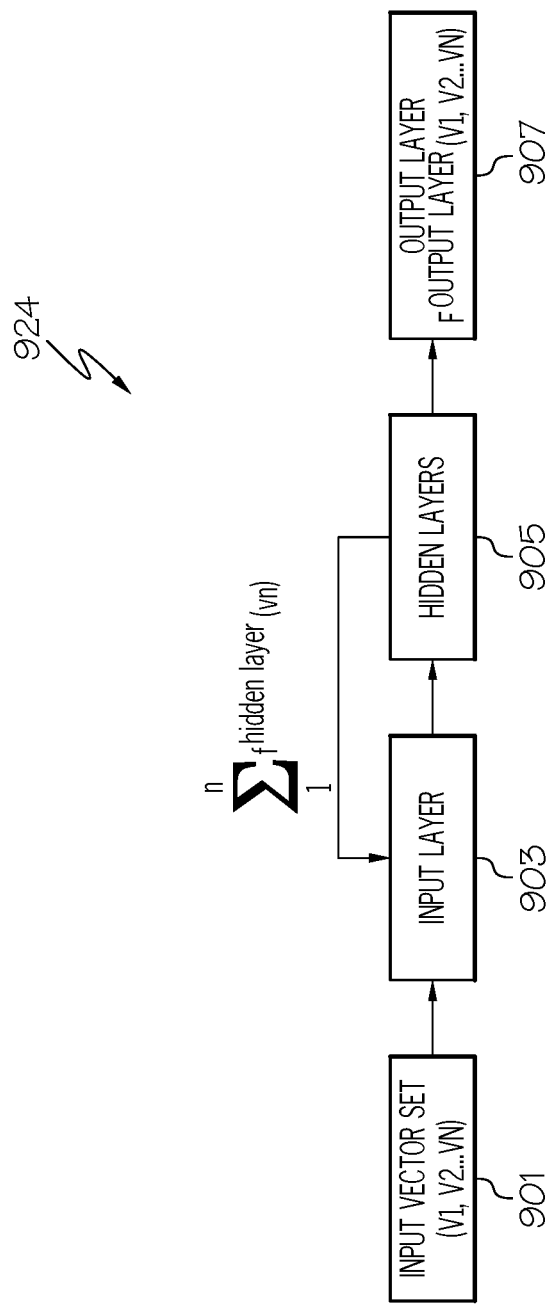
FIG. 9 illustrates an exemplary recurrent neural network used to improve the performance of a computer and/or other devices in accordance with one or more embodiments of the present invention.

With reference then to FIG. 9, an exemplary Recurrent Neural Network (RNN) 924 used to evaluate multivariate data, such as (but not limited to) calculating measures of variability in K-step-ahead values for the time series pattern for the time series of multivariate data in multiple historical snapshots, is presented.

As shown in FIG. 9, an input vector set 901 is a series of multivariate values, depicted as v1, v2 . . . vn. This series of values can be different values of data in a single time series, or can be different values of data from different time series. For explanatory purposes, assume that these values are for different times series, such as those shown in FIG. 3.

Input vector set 901 is entered into an input later of RNN 924, which passes the data from input vector set 901 to hidden layers 905 for processing. As the name recurrent neural network infers, an output from the hidden layers 905 for a current vector (e.g., $f(v_1)$) is fed back to the input layer 903, such that the current output for the current vector $f(v_1)$ is combined with a next input vector (e.g., $v_2$) to create a new output from the hidden layers 905 (e.g., $f(v_1+v_2)$). This process repeats until all vectors from the input vector set 901 and their precursive processing results are processed, resulting in an output to the output layer 907, shown as $f^{output\ layer}(v_1, v_2 \ldots v_n)$.

Figure 10:
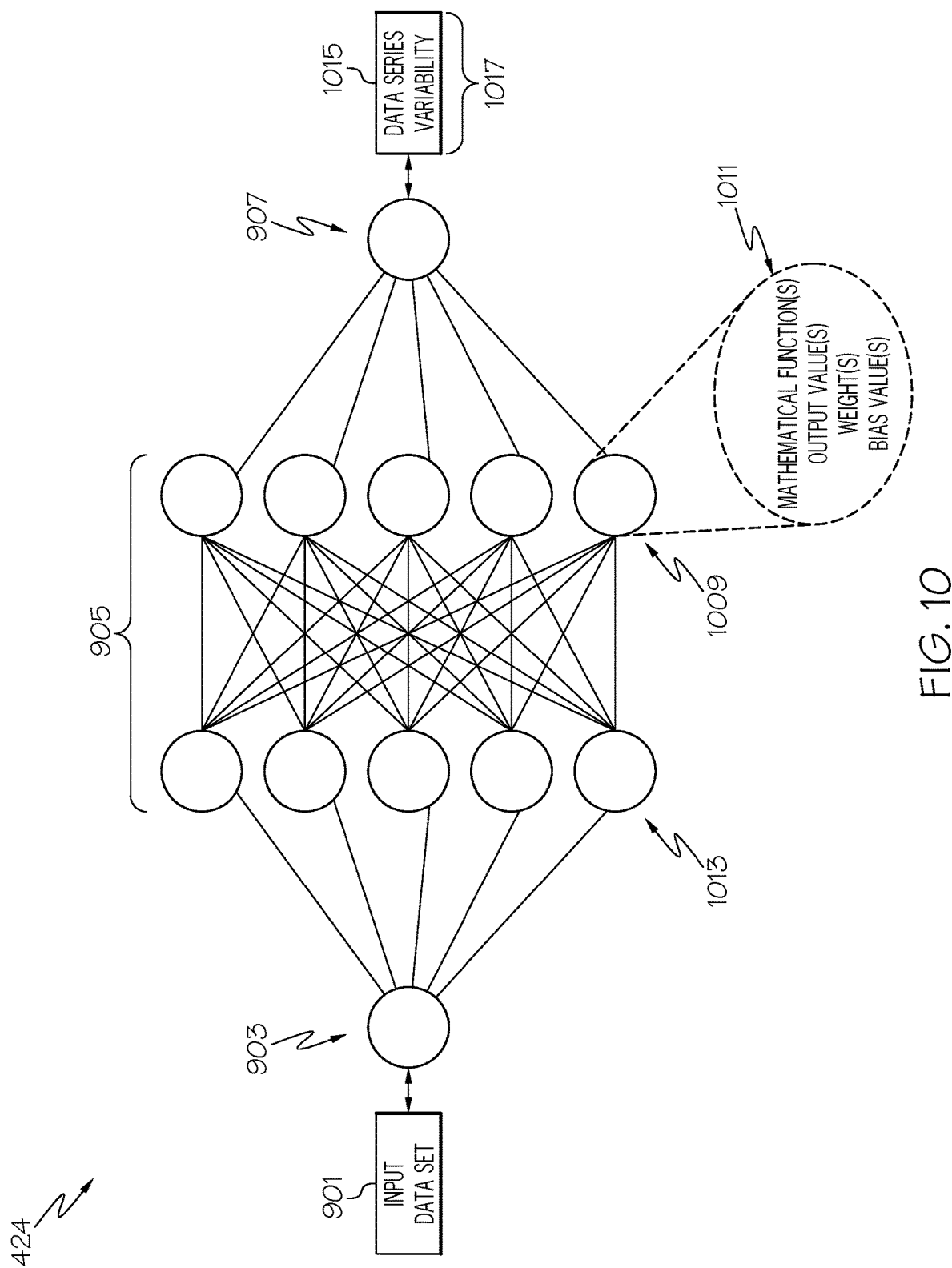
FIG. 10 depicts additional detail of the exemplary recurrent neural network shown in FIG. 9.

With reference now to FIG. 10, additional detail of the RNN 924 shown in FIG. 9 is presented.

As shown in FIG. 10, the electronic neurons in RNN 924 are arranged in layers, known as the input layer 903, hidden layers 905, and an output layer 907. The input layer 903 includes neurons/nodes that take input data, and send it to a series of hidden layers of neurons (e.g., hidden layers 905), in which neurons from one layer in the hidden layers are interconnected with all neurons in a next layer in the hidden layers 905. The final layer in the hidden layers 905 then outputs a computational result to the output layer 907, which is often multiple nodes, each of which holds vector information. In one or more embodiments of the present invention, each neuron in the output layer 907 is associated with a particular output to output 1017, as shown in FIG. 10.

As mentioned above, each node in the depicted RNN 924 represents an electronic neuron, such as the depicted neuron 1009. As shown in block 1011, each neuron (including neuron 1009) includes multiple features, such as: a mathematical function, an output value, a weight, and a bias value.

The mathematical function is a mathematic formula for processing data from one or more upstream neurons. For example, assume that one or more of the neurons depicted in the middle hidden layers 1005 send data values to neuron 1009. Neuron 1009 then processes these data values by executing the mathematical function shown in block 1011, in order to create one or more output values, which are then sent to another neuron, such as another neuron within the hidden layers 905 or a neuron in the output layer 907. Each neuron also has a weight that is specific for that neuron and/or for other connected neurons. Furthermore, the output value(s) are added to bias value(s), which increase or decrease the output value, allowing the RNN 924 to be further "fine-tuned".

For example, assume that neuron 1013 is sending the results of its analysis of a piece of data to neuron 1009. Neuron 1009 has a first weight that defines how important data coming specifically from neuron 1013 is. If the data is important, then data coming from neuron 1013 is weighted heavily, and/or increased by the bias value, thus causing the mathematical function (s) within neuron 1009 to generate a higher output, which will have a heavier impact on neurons in the output layer 907. Similarly, if neuron 1013 has been determined to be significant to the operations of neuron 1009, then the weight in neuron 1013 will be increased, such that neuron 1009 receives a higher value for the output of the mathematical function in the neuron 1013. Alternatively, the output of neuron 1009 can be minimized by decreasing the weight and/or bias used to affect the output of neuron 1009. These weights/biases are adjustable for one, some, or all of the neurons in the RNN 924, such that a reliable output will result from output layer 907. Such adjustments are alternatively performed manually or automatically.

When manually adjusted, the mathematical function(s), output value(s), weight(s), and/or bias value(s) are adjusted by the user in a repeated manner until the output from output layer 907 matches expectations. The content of the neuron/node in the output layer 907 is compared with the expected vector. The mathematical function(s), output value(s), weight(s), and/or bias value(s) shown in block 1011 are manually adjusted until the data series variability 1015 output is determined.

When automatically adjusted, the mathematical functions, output values, weights, and/or biases are adjusted using "back propagation", in which a "gradient descent" method determines how each mathematical function, output value, weight, and/or bias should be adjusted in order to provide an output 1017 that is accurate. That is, the mathematical function(s), output value(s), weight(s), and/or bias value(s) shown in block 1011 are recursively adjusted until the data series variability 1015 output is determined.

Figure 11:
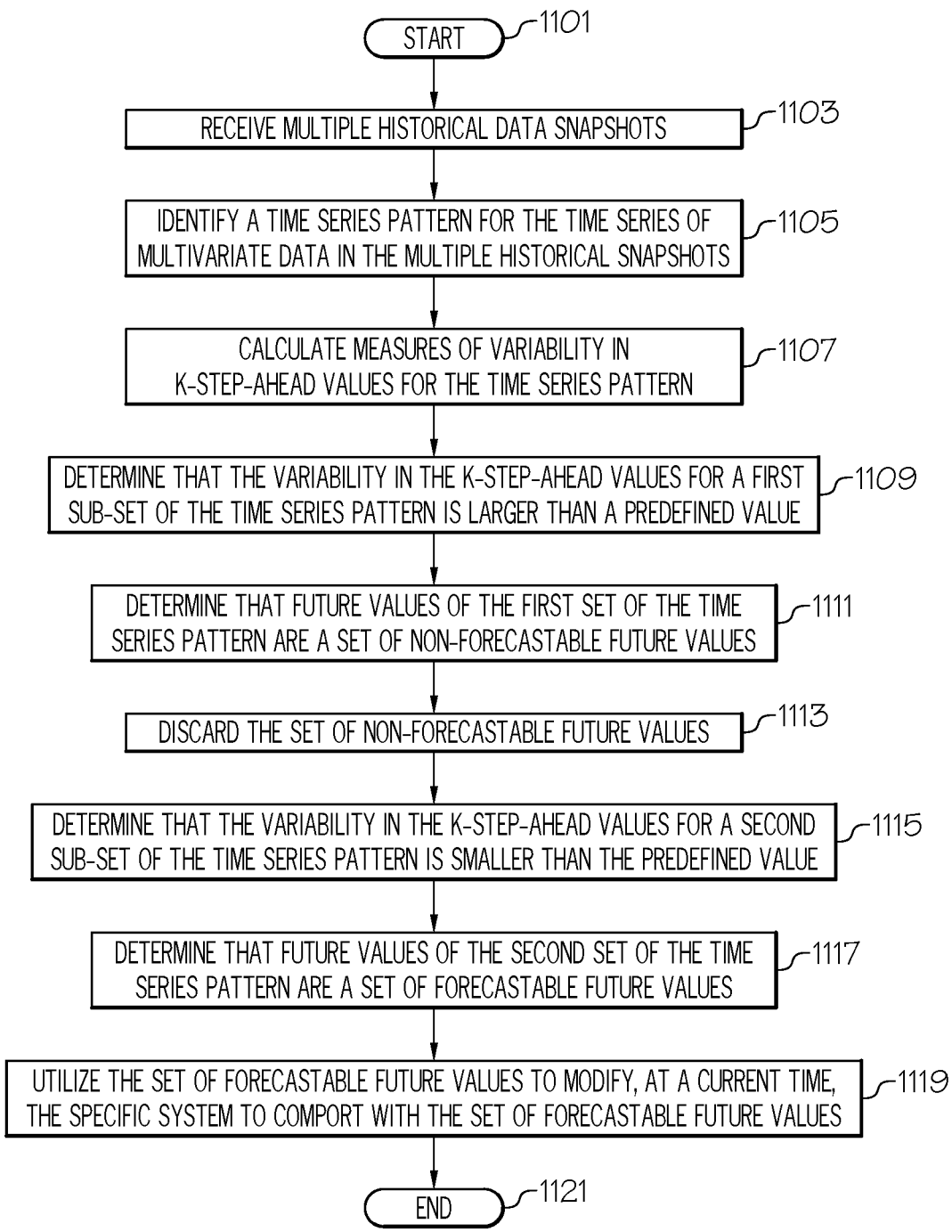
FIG. 11 illustrates a high-level flow chart of one or more steps performed in accordance with one or more embodiments of the present invention.

With reference now to FIG. 11, a high level flow chart of a method for improving a future efficiency of a specific system according to one or more embodiments of the present invention is presented.

After initiator block 1101, one or more processors (e.g., CPU 100 shown in FIG. 1) receive multiple historical data snapshots, as described in block 1103 and depicted in FIG. 3. The data in the multiple historical data snapshots describe past operational states of a specific system, and in one or more embodiments of the present invention are a time series of multivariate data (i.e., data derived from multiple different variables).

As described in block 1105, the processor(s) identify a time series pattern for the time series of multivariate data in the multiple historical snapshots, as shown in FIG. 3.

As described in block 1107, the processor(s) then calculate measures of variability in K-step-ahead values for the time series pattern for the time series of multivariate data in the multiple historical snapshots. That is, processors (e.g., neurons in RNN 924 described above) determine how much a time series pattern for data varies in each passing K block of time.

As described in block 1109, the processor(s) determining that the variability in the K-step-ahead values for a first sub-set of the time series pattern is larger than a predefined value (e.g., as shown in window 300 in FIG. 3). Based on this determination, the processor(s) determine that future values of the first set of the time series pattern are a set of non-forecastable future values, since there is too much variance between data series (see block 1111).

As such, this sub-set of data series are ignored and/or discarded (see block 1113).

However, a second sub-set of the time series pattern is closer to a baseline that has been previously set. As such, and as described in block 1115, the processor(s) determine that the variability in the K-step-ahead values for a second sub-set of the time series pattern for the multivariate data from the multiple historical snapshots is smaller than the predefined value.

As described in block 1117, in response to determining that the variability in the K-step ahead values for a second sub-set of the time series pattern is smaller than the predefined value, the processor(s) determine that future values of the second set of the time series pattern are a set of forecastable future values, since the K-set ahead values are small.

As described in block 1119, a user, automated system figuration device, etc. then utilizes the set of forecastable future values to modify, at a current time, the specific system to comport with the set of forecastable future values, such that modifying the specific system improves an efficiency of the specific system by causing the specific system to generate the second sub-set of the time series pattern at a future time.

For example, assume that the particular system is a computer that utilizes the one or more processors. Assume further that sensors within that computer (e.g., the computer sensors 1256 shown within computer 1202 in FIG. 12 discussed below), monitor throughput of instruction execution, output of data/information to an external network 1228, etc. Utilizing the method described herein for determining whether a data series (in this case, a data series of sensor data describing the operational throughput, data output, etc. of computer 1202) can be predicted for the future based on the times series patterns described herein. For example, assume that, by using the method described herein, a prediction can be accurately made that in the future computer 1202 will be called upon to once again output a certain bandwidth of data. Assume further that this certain bandwidth of future data is video data, which computer 1202 has had to sacrifice other features in order to produce this amount of video data. That is, if computer 1202 is being tasked to perform some secondary function (e.g., checking for email) as well as its primary function (e.g., putting video content on an external network), and yet is underpowered to both in a timely manner, then the secondary function will be delayed and/or ignored with the primary function is being performed.

In order to improve the efficiency of computer 1202, an existing component (e.g., one of the processors 1204) of the computer 1202 is replaced with a different component (e.g., a graphical processing unit—GPU), thus taking the burden of performing the primary function (putting video content on network 1228) from the microprocessor that was previously part of the processors 1204. Thus, replacing the existing component with the different component causes the computer to generate the second set-set of the time series pattern (resulting from putting the video content on the network) at the future time without overtaxing the processors 1204 that remain after the GPU is added (and/or replaces one of the original general purpose processors from processors 1204).

In an embodiment of the present invention, the particular system is a unit of industrial equipment (e.g., shown in FIG. 12 as industrial equipment 1252, such as a pumping station in a refinery) that is monitored (e.g., by the industrial equipment sensors 1254 shown in FIG. 12) and controlled by the one or more processors (e.g., processors 1204 in computer 1202). Assume that this pumping station has been able to output a required amount of liquid volume to supply a production tower in the refinery (its primary function), but at the expense of not having the capacity to keep a fire suppression system pressurized. Thus, in an embodiment of the present invention an existing component of the unit of industrial equipment is added to the pumping station, and/or replaces an original pump in the pumping station, such that replacing the existing component/pump with the different component/pump and/or adding an additional component/pump causes the unit of industrial equipment to generate the second sub-set of the time series pattern at the future time. That is, assume that in the past that the pumping station (industrial equipment 1252) was able to output the required amount of liquid volume to the production tower. However, in the future the pumping station is required to not only output the required amount of liquid volume to the production tower, but is also required to charge a fire suppression system (e.g., assume that a fire has broken out). In order to still be able to output the required amount of liquid volume to the production tower (as correctly predicted) as well as support the fire suppression system (e.g., as also predicted based on previous historical data), an additional pump is added to the pumping station, so that both functions can be performed at the same time.

The flowchart shown in FIG. 11 ends at terminator block 1121.

In one or more embodiments of the present invention, the processor(s) perform non-parametric testing of a distribution of the set of forecastable future values, such as the Kolmogorov-Smirnov test shown in block 810 in FIG. 8 and/or the Epps-Singleton test shown in block 808 in FIG. 8.

As shown in FIG. 3, in one or more embodiments of the present invention, each of the time series of multivariate data has a set window size.

Figure 12:
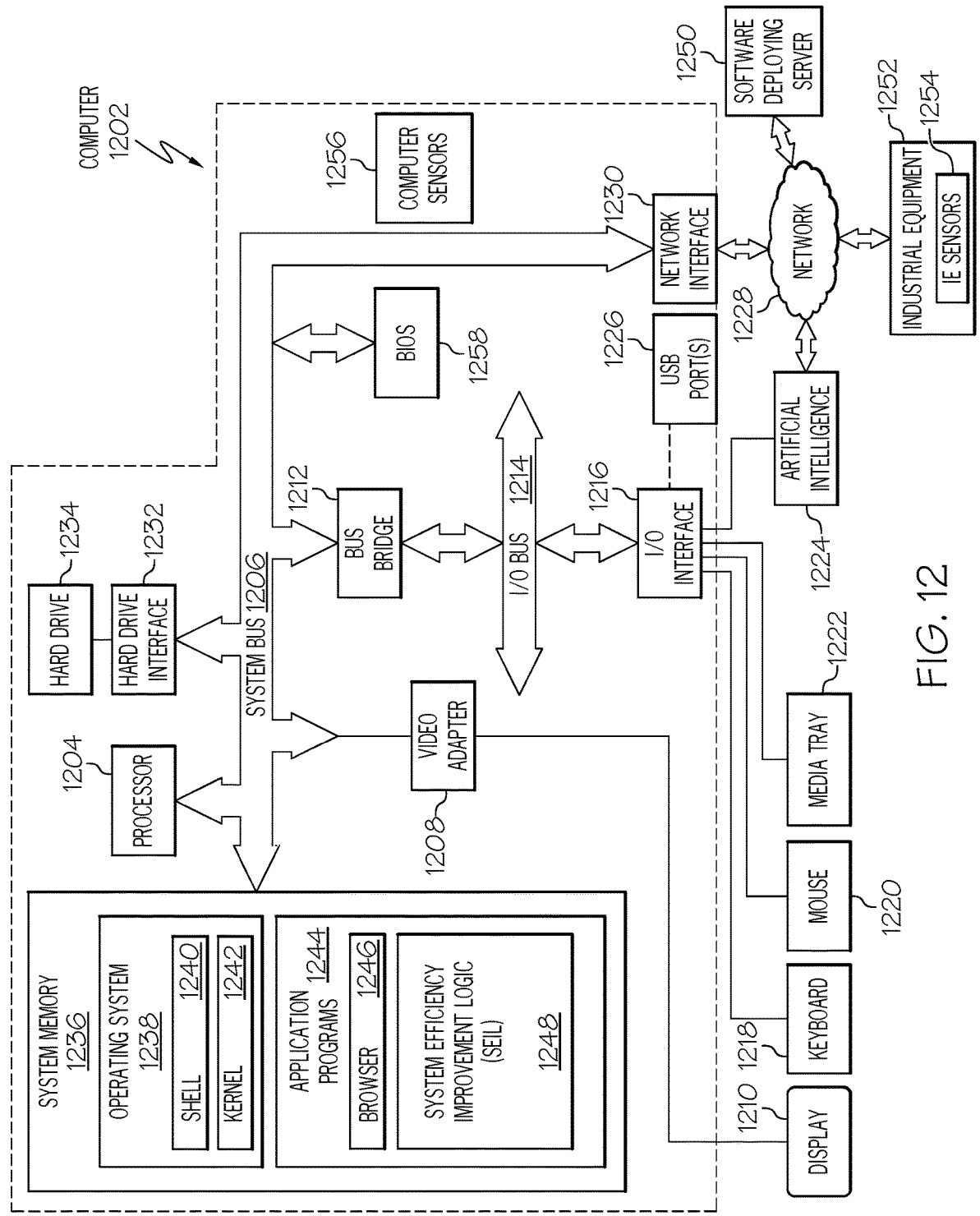
FIG. 12 depicts additional detail of an exemplary system and network, such as that shown in FIG. 1, in which the present invention is implemented in various embodiments.

In one or more embodiments of the present invention, the multivariate data are raw data (e.g., raw sensor data coming from computer sensors 1256, IE sensors 1254, etc. shown in FIG. 12).

In one or more embodiments of the present invention, the multivariate data about the specific system is replaced with univariate data about the specific system. That is, in one or more embodiments of the present invention, the data in the multiple historical data snapshots for the specific system describes only a single aspect/feature (univariate) about the specific system, rather than describing multiple aspects/features (multivariate) about the specific system. For example, if sensor data from a pump in a refinery describes the pressure, temperature, and flow-rate within that pump, then this sensor data is multivariate, and is used together when determining if the time series pattern is forecastable. However, if sensor data from the pump in the refinery describes only the flow-rate within that pump, then this sensor data is univariate, and is used alone when determining if the time series pattern is forecastable.

In one or more embodiments of the present invention, the multivariate data includes derived data that is based on a slope of changes in data from the historical data snapshots, auto correlations of data from the historical data snapshots, and cross correlations of data from the historical data snapshots. That is, besides evaluating raw sensor data from the specific system, the method also uses the slope of changes in data from the historical data snapshots, auto correlations of data from the historical data snapshots, and cross correlations of data from the historical data snapshots when determining whether the future values are forecastable.

The slope of changes in data from the historical data snapshots looks at the rate (slope) of changes in data. Thus, if data changes are minimal, then the forecastability of the future values is greater.

Auto correlations of data from the historical data snapshots occur when a first datum and a second datum within a same data snapshot are correlated (i.e., the first datum is a same type of datum as the second datum; the first datum is the result of a same operation and/or is otherwise related to the second datum; and/or a first event that resulted in the generation of the first datum caused a second event that resulted in the generation of the second datum), and cross correlations of data from the historical data snapshots occur when data from two different data snapshots is correlated.

In one or more embodiments of the present invention, the processor(s) associate multiple combinations of data from each of the time series of multivariate data by using a self-attention feature of a transformer, where the self-attention feature of the transformer generates multiple vectors of multiple corresponding combinations of data; and utilize the multiple vectors of multiple corresponding combinations of data as the multivariate data. That is, rather than serially process the data, the data is transformed into a group of associated data, and processed as a single batch.

For example, assume that sensor data produces four data vectors: $v_1$, $v_2$, $v_3$, $v_4$. Rather that serially evaluate each data vector (as described in FIG. 9 and FIG. 10), these four data vectors are combined in different combinations (e.g., $v_1+v_2$; $v_1+v_3$; $v_1+v_4$; $v_2+v_3$; $v_2+v_4$; $v_3+v_4$). This transformation allows the different vectors/time series of data to be processed in concurrent batches, thus expediting the calculations.

In an embodiment of the present invention, the processor(s) generate a p-value for the second sub-set of the time series pattern; compare a statistical distribution of the second sub-set of the time series pattern to a predefined baseline distribution pattern for a known physical system, where the statistical distribution of the second sub-set of the time series pattern is based on the p-value; determine that the statistical distribution of the second sub-set of the time series pattern matches the predefined baseline distribution pattern; in response to determining that the statistical distribution of the second sub-set of the time series pattern matches the predefined baseline distribution pattern, determine that the second sub-set of the time series pattern and the predefined baseline distribute pattern are generated by a same physical system; and in response to determining that the second sub-set of the time series pattern and the predefined baseline distribute pattern are generated by the same physical system, further determine that the future values of the second set of the time series pattern are the set of forecastable future values.

That is, if the p-value is low enough (as described above), then it is likely that the time series data came from a same device, and thus is more likely to be forecastable.

In one or more embodiments of the present invention, the further determining that the future values of the second set of the time series pattern are the set of forecastable future values, as just described above, further includes non-parametric testing of a distribution of the set of forecastable future values, where the non-parametric testing of distributions is based on a test from a group of tests consisting of a Kolmogorov-Smirnov test and an Epps-Singleton test.

In one or more embodiments, the present invention further includes identifying the multiple historical data snapshots through a similarity search of a set of other historical data snapshots. That is, any historical data snapshots that have similar features (e.g., describe a same type of physical device, are from a same time frame, and/or describe same types of event) are used as the multiple historical data snapshots in the method(s) described herein.

In one or more embodiments, the present invention further includes excluding a use of the set of non-forecastable future values in system modification to improve efficiency of the specific system. That is, only the forecastable future values are used to modify the specific system (as described above), while non-forecastable future values are ignored, deleted from memory, etc.

With reference now to FIG. 12, there is depicted a block diagram of additional detail of the computers/system shown in FIG. 1. Note that some or all of the exemplary architecture, including both depicted hardware and software, shown for and within computer 1202 can be utilized by artificial intelligence 1224 and/or software deploying server 1250 and/or industrial equipment 1252 and/or IE sensors 1254, and/or one or more of the neurons/nodes shown in the RNN 924 depicted in FIG. 9 and FIG. 10.

Exemplary computer 1202 includes a processor 1204 that is coupled to a system bus 1206. Processor 1204 can utilize one or more processors, each of which has one or more processor cores. A video adapter 1208, which drives/supports a display 1210, is also coupled to system bus 1206. System bus 1206 is coupled via a bus bridge 1212 to an input/output (I/O) bus 1214. An I/O interface 1216 is coupled to I/O bus 1214. I/O interface 116 affords communication with various I/O devices, including a keyboard 1218, a mouse 1220, a media tray 1222 (which can include storage devices such as CD-ROM drives, multi-media interfaces, etc.), an artificial intelligence 1224, and external USB port(s) 1226. While the format of the ports connected to I/O interface 1216 can be any known to those skilled in the art of computer architecture, in one embodiment some or all of these ports are universal serial bus (USB) ports.

As depicted, computer 1202 is also able to communicate with artificial intelligence 1224 and/or software deploying server 1250 and/or industrial equipment 1252 using a network interface 1230 to a network 1228. Network interface 1230 is a hardware network interface, such as a network interface card (NIC), etc. Network 1228 can be an external network such as the Internet, or an internal network such as an Ethernet or a virtual private network (VPN). One or more examples of industrial equipment 1252 are discussed above.

A hard drive interface 1232 is also coupled to system bus 1206. Hard drive interface 1232 interfaces with a hard drive 1234. In one embodiment, hard drive 1234 populates a system memory 1236, which is also coupled to system bus 1206. System memory is defined as a lowest level of volatile memory in computer 1202. This volatile memory includes additional higher levels of volatile memory (not shown), including, but not limited to, cache memory, registers and buffers. Data that populates system memory 1236 includes computer 1202's operating system (OS) 1238 and application programs 1244.

OS 1238 includes a shell 1240, for providing transparent user access to resources such as application programs 1244. Generally, shell 1240 is a program that provides an interpreter and an interface between the user and the operating system. More specifically, shell 1240 executes commands that are entered into a command line user interface or from a file. Thus, shell 1240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 1242) for processing. Note that while shell 1240 is a text-based, line-oriented user interface, the present invention will equally well support other user interface modes, such as graphical, voice, gestural, etc.

As depicted, OS 1238 also includes kernel 1242, which includes lower levels of functionality for OS 1238, including providing essential services required by other parts of OS 1238 and application programs 1244, including memory management, process and task management, disk management, and mouse and keyboard management.

Application programs 1244 include a renderer, shown in exemplary manner as a browser 1246. Browser 146 includes program modules and instructions enabling a world wide web (WWW) client (i.e., computer 1202) to send and receive network messages to the Internet using hypertext transfer protocol (HTTP) messaging, thus enabling communication with software deploying server 1250 and other computer systems.

Application programs 1244 in computer 1202's system memory (as well as software deploying server 1250's system memory) also include a System Efficiency Improvement Logic (SEIL) 148. SEIL 1248 includes code for implementing the processes described below, including those described in FIGS. 2-12. In one embodiment, computer 1202 is able to download SEIL 1248 from software deploying server 1250, including in an on-demand basis, wherein the code in SEIL 1248 is not downloaded until needed for execution. Note further that, in one embodiment of the present invention, software deploying server 1250 performs all of the functions associated with the present invention (including execution of SEIL 1248), thus freeing computer 1202 from having to use its own internal computing resources to execute SEIL 1248.

As discussed, the process shown in FIG. 9 and FIG. 10 uses a recursive neural network, which is a type of artificial intelligence 1224 shown in FIG. 1.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
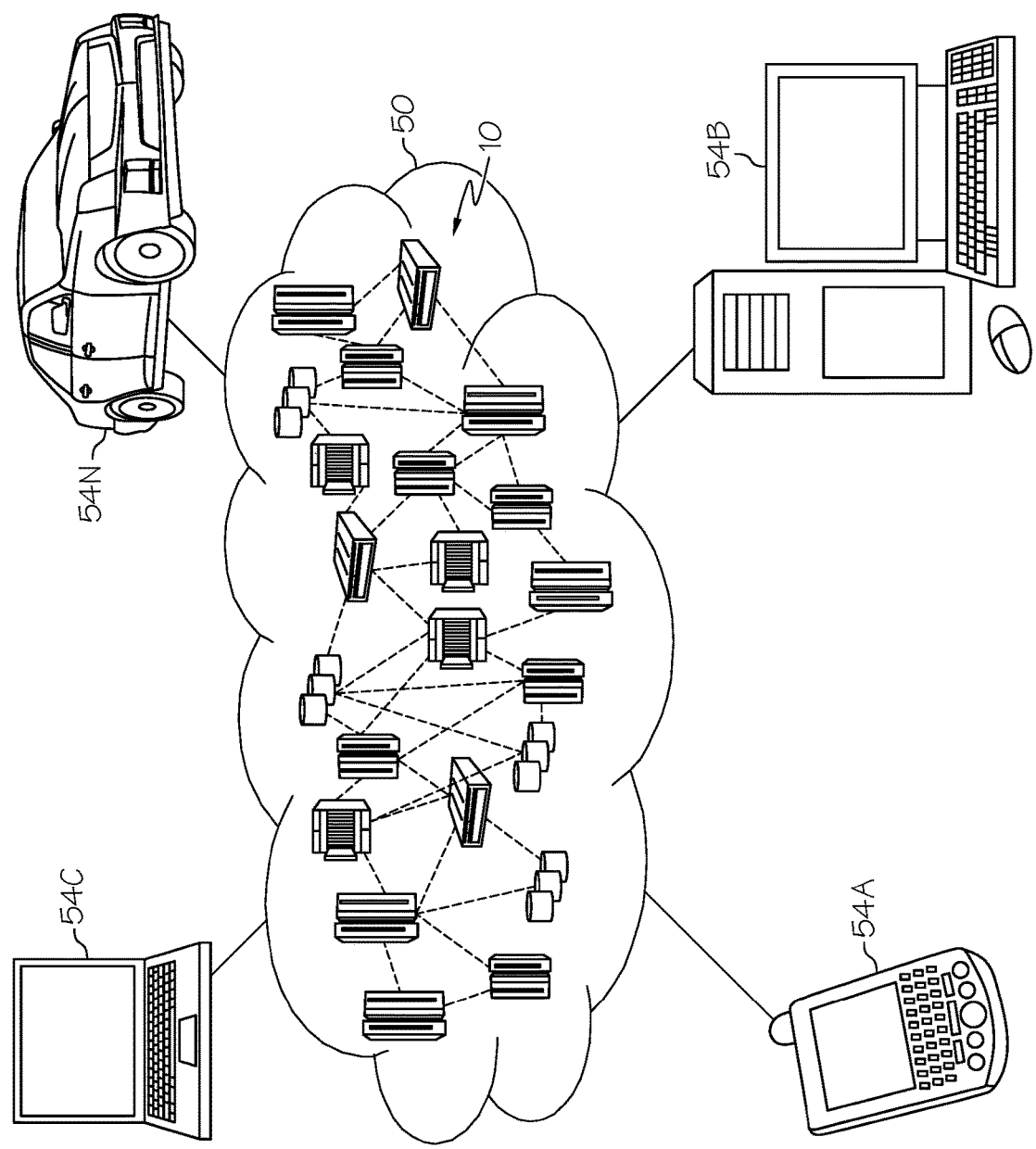
FIG. 13 depicts a cloud computing environment according to one or more embodiments of the present invention.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 13 are intended to be illustrative only and that computing nodes 10 and cloud computing environment 50 can communicate with any type of computerized device over any type of network and/or network addressable connection (e.g., using a web browser).

Figure 14:
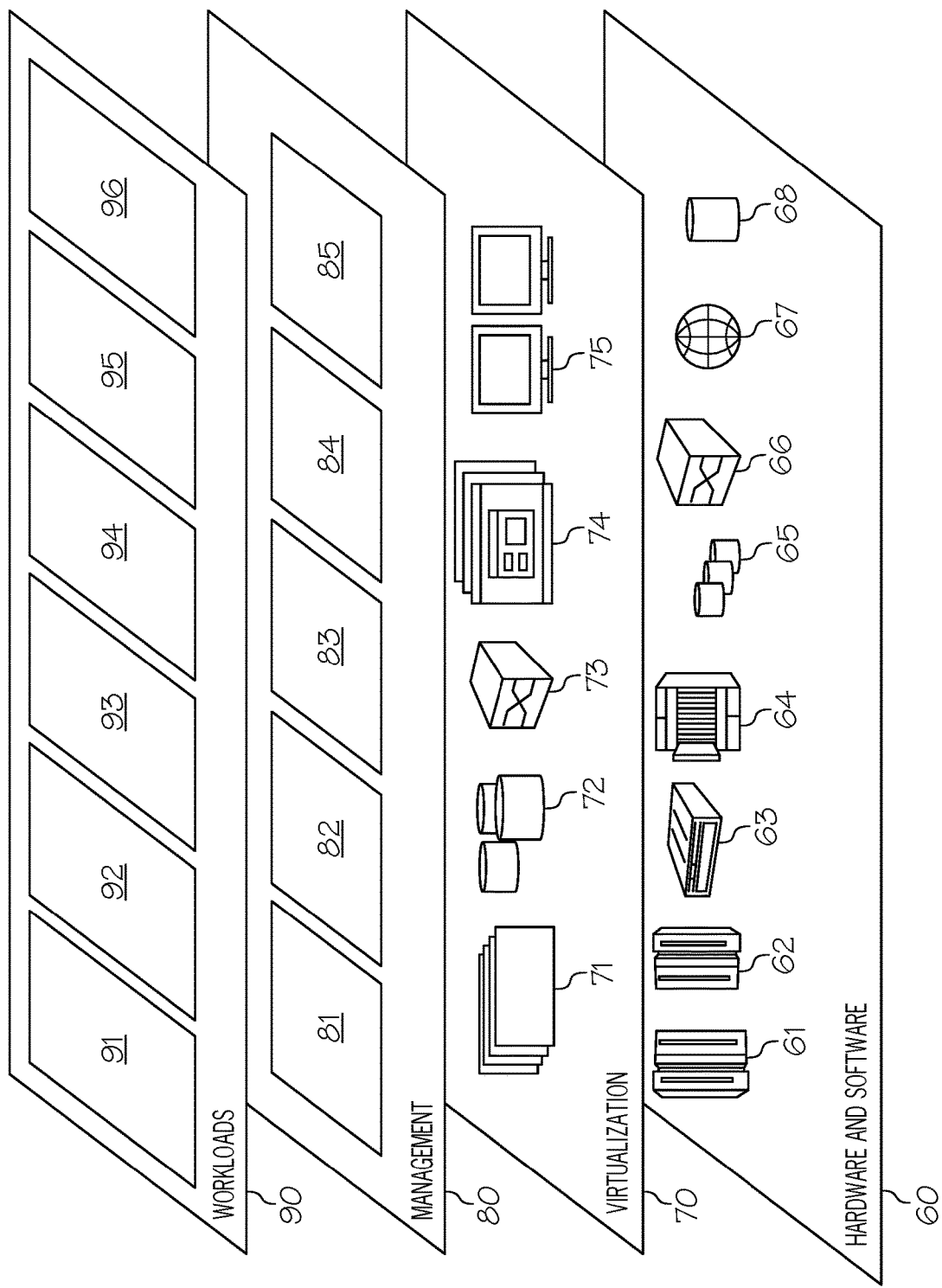
FIG. 14 illustrates abstraction model layers of a cloud computer environment according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and system efficiency improvement processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of improving a future efficiency of a specific system, the method comprising:
   receiving, by one or more processors, multiple historical data snapshots, wherein data in the multiple historical data snapshots describe past operational states of a specific system, and wherein the data in the multiple historical data snapshots is a time series of data;
   identifying, by the one or more processors, a time series pattern for the time series of data in the multiple historical snapshots;
   calculating, by the one or more processors, measures of variability in values for the time series pattern for the time series of multivariate data in the multiple historical snapshots;
   determining, by the one or more processors, that the variability in the values for a first sub-set of the time series pattern is larger than a predefined value;
   in response to determining that the variability in the values for a first sub-set of the time series pattern is larger than the predefined value, determining, by the one or more processors, that future values of the first set of the time series pattern are a set of non-forecastable future values;
   determining, by the one or more processors, that the variability in the values for a second sub-set of the time series pattern for the multivariate data from the multiple historical snapshots is smaller than the predefined value;
   in response to determining that the variability in the values for a second sub-set of the time series pattern is smaller than the predefined value, determining, by the one or more processors, that future values of the second set of the time series pattern are a set of forecastable future values; and
   utilizing the set of forecastable future values to modify, at a current time, the specific system to comport with the set of forecastable future values, wherein comporting with the set of forecastable future values improves an efficiency of the specific system.

2. The method of claim 1, further comprising:
   non-parametric testing, by the one or more processors, of a distribution of the set of forecastable future values.

3. The method of claim 2, wherein the non-parametric testing of distributions is based on a test from a group of tests consisting of a Kolmogorov-Smirnov test and an Epps-Singleton test.

4. The method of claim 1, wherein each of the time series of data has a set window size.

5. The method of claim 1, wherein the data are raw data.

6. The method of claim 1, wherein the data includes derived data, wherein the derived data is based on a slope of changes in data from the historical data snapshots, auto correlations of data from the historical data snapshots, and cross correlations of data from the historical data snapshots.

7. The method of claim 1, wherein the data in the multiple historical data snapshots is multivariate data.

8. The method of claim 1, wherein the data in the multiple historical data snapshots is univariate data.

9. The method of claim 1, further comprising:
   associating, by the one or more processors, multiple combinations of data from each of the time series of data by using a self-attention feature of a transformer, wherein the self-attention feature of the transformer generates multiple vectors of multiple corresponding combinations of data; and
   utilizing, by the one or more processors, the multiple vectors of multiple corresponding combinations of data as the data in the time series of data.

10. The method of claim 1, wherein the specific system is a computer that utilizes the one or more processors.

11. The method of claim 10, further comprising:
    replacing an existing component of the computer with a different component, wherein replacing the existing component with the different component causes the computer to not generate the second set-set of the time series pattern at the future time.

12. The method of claim 1, wherein the specific system is a unit of industrial equipment that is monitored and controlled by the one or more processors.

13. The method of claim 12, further comprising:
    replacing an existing component of the unit of industrial equipment with a different component, wherein replacing the existing component with the different component causes the unit of industrial equipment to not generate the second sub-set of the time series pattern at the future time.

14. The method of claim 1, further comprising:
    discarding, by the one or more processors, the set of non-forecastable future values.

15. The method of claim 1, further comprising:
    generating, by the one or more processors, a p-value for the second sub-set of the time series pattern;
    comparing, by the one or more processors, a statistical distribution of the second sub-set of the time series pattern to a predefined baseline distribution pattern for a known physical system, wherein the statistical distribution of the second sub-set of the time series pattern is based on the p-value;

determining, by the one or more processors, that the statistical distribution of the second sub-set of the time series pattern matches the predefined baseline distribution pattern;

in response to determining that the statistical distribution of the second sub-set of the time series pattern matches the predefined baseline distribution pattern, determining, by the one or more processors, that the second sub-set of the time series pattern and the predefined baseline distribute pattern are generated by a same physical system; and in response to determining that the second sub-set of the time series pattern and the predefined baseline distribute pattern are generated by the same physical system, further determining, by the one or more processors, that the future values of the second set of the time series pattern are the set of forecastable future values.

16. The method of claim 15, further comprising:

non-parametric testing, by the one or more processors, of a distribution of the set of forecastable future values, wherein the non-parametric testing of distributions is based on a test from a group of tests consisting of a Kolmogorov-Smirnov test and an Epps-Singleton test.

17. The method of claim 1, further comprising:

excluding a use of the set of non-forecastable future values in system modification to improve efficiency of the specific system.

18. A computer program product comprising a non-transitory computer readable storage medium having program code embodied therewith, wherein the program code is readable and executable by a processor to perform a method of improving a future efficiency of a specific system, and wherein the method comprises:

receiving multiple historical data snapshots, wherein data in the multiple historical data snapshots describe past operational states of a specific system, and wherein the data in the multiple historical data snapshots is a time series of multivariate data;

identifying a time series pattern for the time series of multivariate data in the multiple historical snapshots;

calculating measures of variability in K-step-ahead values for the time series pattern for the time series of multivariate data in the multiple historical snapshots;

determining that the variability in the K-step-ahead values for a first sub-set of the time series pattern is larger than a predefined value;

in response to determining that the variability in the K-step-ahead values for a first sub-set of the time series pattern is larger than the predefined value, determining that future values of the first set of the time series pattern are a set of non-forecastable future values;

discarding the set of non-forecastable future values;

determining that the variability in the K-step-ahead values for a second sub-set of the time series pattern for the multivariate data from the multiple historical snapshots is smaller than the predefined value;

in response to determining that the variability in the K-step ahead values for a second sub-set of the time series pattern is smaller than the predefined value, determining that future values of the second set of the time series pattern are a set of forecastable future values; and utilizing the set of forecastable future values to modify, at a current time, the specific system to comport with the set of forecastable future values, wherein comporting with the set of forecastable future values improves an efficiency of the specific system.

19. The computer program product of claim 18, wherein the program code is provided as a service in a cloud environment.

20. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving multiple historical data snapshots, wherein data in the multiple historical data snapshots describe past operational states of a specific system, and wherein the data in the multiple historical data snapshots is a time series of multivariate data;

identifying a time series pattern for the time series of multivariate data in the multiple historical snapshots;

calculating measures of variability in K-step-ahead values for the time series pattern for the time series of multivariate data in the multiple historical snapshots;

determining that the variability in the K-step-ahead values for a first sub-set of the time series pattern is larger than a predefined value;

in response to determining that the variability in the K-step-ahead values for a first sub-set of the time series pattern is larger than the predefined value, determining that future values of the first set of the time series pattern are a set of non-forecastable future values;

discarding the set of non-forecastable future values;

determining that the variability in the K-step-ahead values for a second sub-set of the time series pattern for the multivariate data from the multiple historical snapshots is smaller than the predefined value;

in response to determining that the variability in the K-step ahead values for a second sub-set of the time series pattern is smaller than the predefined value, determining that future values of the second set of the time series pattern are a set of forecastable future values; and utilizing the set of forecastable future values to modify, at a current time, the specific system to comport with the set of forecastable future values, wherein comporting with the set of forecastable future values improves an efficiency of the specific system.

\* \* \* \* \*